United States Patent Office 2,860,153
Patented Nov. 11, 1958

2,860,153
METHOD OF PREPARING β-CYANOETHYLTRI-CHLOROSILANE

John C. Saam, Essexville, Mich., assignor to Dow Corning Corporation, Midland, Mich., a corporation of Michigan No Drawing. Application April 25, 1957
Serial No. 655,015

2 Claims. (Cl. 260—448.2)

This invention relates to the method of preparing organo functional silanes having nitrile groups in the side chain.

It has long been desired to prepare organo-siloxanes having nitrile groups attached to a hydrocarbon radical on the silicon. Such siloxanes possess unique properties due to the presence of the cyanide group. This includes among others a greater resistance to hydrocarbon solvents than is found in hydrocarbon substituted siloxanes.

The most obvious way of preparing such siloxanes would be to add acrylonitrile to a SiH containing silane to produce β-cyanoethyltrichlorosilane and to thereafter hydrolyze the chlorosilane to the corresponding siloxane. This method would be extremely attractive commercially due to the readily availability of acrylonitrile. However, the addition of acrylonitrile to SiH containing silanes has proved to be extremely difficult.

It is the object of this invention to provide a method of preparing β-cyanoethyltrichlorosilane in good yields by a commercially feasible process.

In accordance with this invention a mixture of acrylonitrile and trichlorosilane is heated at a temperature less than 150° C. in the presence of a catalytic amount of an amide of the group $RCONR'_2$ and $ArNHOCR''$ where R is of the group hydrogen, saturated aliphatic and aromatic hydrocarbon radicals, R' is a lower alkyl radical, Ar is an aryl hydrocarbon radical and R'' is hydrogen or alkyl.

Applicant has found that when acrylonitrile and trichlorosilane are heated in the presence of the defined amide catalyst that good yields of the desired β-cyanoethyltrichlorosilane are obtained. In general, the amount of catalyst is not critical although the preferred amount is from .05 to .1 mol of amide per mol of acrylonitrile. The mol ratio of acrylonitrile to trichlorosilane is not critical although the best yields are obtained by employing an excess of trichlorosilane.

In order to avoid undesirable side reactions the process should be carried out at a temperature below 150° C. The reaction proceeds at temperatures ranging from 25° C. up. Reaction may be carried out at atmospheric pressure, but it is often desirable to carry out the reaction at superatmospheric pressure.

Applicant has found that the reaction proceeds quite readily in the presence of N,N-disubstituted amides of aliphatic and aromatic carboxylic acids in those cases where the R' groups on the hydrogen are lower alkyl hydrocarbon radicals. It has been found that when the amide has only one alkyl group attached to the nitrogen and where the amide has two aromatic hydrocarbon groups attached to the nitrogen, the compounds are not operative.

The second class of amides which are operative herein are those having one aromatic hydrocarbon radical and one hydrogen atom attached to the nitrogen. Specific examples of operative amides are

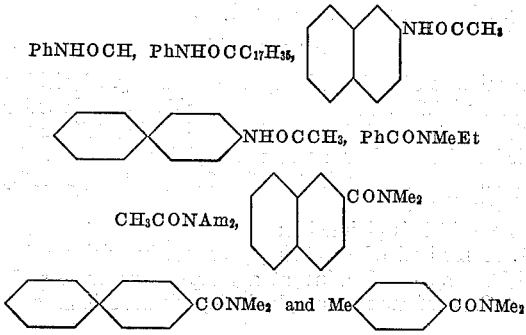

PhNHOCH, PhNHOCC₁₇H₃₅,

⬡⬡NHOCCH₃, PhCONMeEt

⬡⬡NHOCCH₃

CH₃CONAm₂, ⬡⬡CONMe₂

⬡⬡CONMe₂ and Me⬡⬡CONMe₂

The products of this invention are useful in treating fabrics and as intermediates in the preparation of siloxane rubbers.

The following examples are illustrative only and should not be construed as limiting the invention which is properly delineated in the appended claims.

Example 1

8.8 g. of N,N-diethylbenzamide, 53 g. of acrylonitrile and 135.5 g. of trichlorosilane were refluxed for 48 hours. The reflux temperature rose to 72° C. The product was distilled to obtain 70.6 g. of β-cyanoethyltrichlorosilane. This material distilled to 85 to 95° C. at 10 mm. and had a melting point of 33 to 35° C.

Example 2

8.6 g. of N,N-di-n-butylacetamide, 53 g. of acrylonitrile and 135.5 g. of trichlorosilane were refluxed for 28 hours. The reaction mixture was distilled to obtain 71.8 g. of β-cyanoethyltrichlorosilane.

Example 3

11.3 g. of N,N-diethyldecanamide ($C_{10}H_{21}CONEt_2$), 53 g. of acrylonitrile and 135.5 g. of trichlorosilane were refluxed for 28 hours. The product was distilled to obtain 79 g. of β-cyanoethyltrichlorosilane.

Example 4

A mixture of 135.5 g. of trichlorosilane, 53 g. of acrylonitrile and 5 g. of diethylformamide was refluxed for 24 hours. The product was distilled to give 35.8 g. of β-cyanoethyltrichlorosilane.

Example 5

A mixture of 135.5 g. of trichlorosilane, 53 g. of acrylonitrile and 5.7 g. of diethylacetamide was refluxed for 24 hours. The product was then distilled to obtain 10.9 g. of β-cyanoethyltrichlorosilane.

When this experiment was repeated with acetamide no β-cyanoethyltrichlorosilane is obtained.

Example 6

A mixture of 135.5 g. of trichlorosilane, 53 g. of acrylonitrile and 7.5 g. of p-acetotoluide was refluxed for 24 hours. The product was distilled to obtain 80.7 g. of β-cyanoethyltrichlorosilane.

Example 7

A mixture of 135.5 g. of trichlorosilane, 53 g. of acrylonitrile and 6.75 g. of acetanilide was refluxed for 24 hours. The mixture was distilled to obtain 39.7 g. of β-cyanoethyltrichlorosilane.

Example 8

A mixture of 67.8 g. of trichlorosilane, 26.5 g. of acrylonitrile and 4.97 g. of N,N-dibutylbutyramide was refluxed for 26 hours. The product was distilled to give 33.3 g. of β-cyanoethyltrichlorosilane.

Example 9

A mixture of 135.5 g. of trichlorosilane, 53 g. of acrylonitrile, 6.45 g. of N,N-diethylpropionamide was refluxed for 26 hours. The mixture was distilled to give 63 g. of β-cyanoethyltrichlorosilane.

Example 10

A mixture of 106 g. of acrylonitrile, 271 g. of trichlorosilane and 7.2 g. of dimethylformamide was refluxed for 26 hours. Then 67.7 g. of additional trichlorosilane were added and the mixture was refluxed for 24 hours. The product was then distilled to give 272 g. of β-cyanoethyltrichlorosilane.

That which is claimed is:

1. A method of preparing β-cyanoethyltrichlorosilane which comprises heating at a temperature of less than 150° C. a mixture of acrylonitrile, trichlorosilane and a catalytic amount of an amide selected from the group consisting of RCONR′₂ and ArNHOCR″ where R is selected from the group consisting of hydrogen, saturated aliphatic hydrocarbon radicals and aromatic hydrocarbon radicals, R′ is a lower alkyl radical, Ar is an aryl hydrocarbon radical and R″ is selected from the group consisting of hydrogen and alkyl radicals.

2. The method of claim 1 wherein the amide is dimethylformamide.

References Cited in the file of this patent

UNITED STATES PATENTS

| | | |
|---|---|---|
| 2,299,128 | Codd et al. | Oct. 20, 1942 |
| 2,721,873 | MacKenzie et al. | Oct. 25, 1955 |

FOREIGN PATENTS

| | | |
|---|---|---|
| 1,116,726 | France | Feb. 6, 1956 |